(12) United States Patent
Sokolov

(10) Patent No.: US 8,843,750 B1
(45) Date of Patent: Sep. 23, 2014

(54) MONITORING CONTENT TRANSMITTED THROUGH SECURED COMMUNICATION CHANNELS

(75) Inventor: Ilya Sokolov, Boston, MA (US)

(73) Assignee: Symantec Corporation, Mountain View, CA (US)

( * ) Notice: Subject to any disclaimer, the term of this patent is extended or adjusted under 35 U.S.C. 154(b) by 433 days.

(21) Appl. No.: 13/016,394

(22) Filed: Jan. 28, 2011

(51) Int. Cl.
*H04L 9/32* (2006.01)

(52) U.S. Cl.
USPC .......................................... 713/175

(58) Field of Classification Search
None
See application file for complete search history.

(56) References Cited

U.S. PATENT DOCUMENTS

| | | | |
|---|---|---|---|
| 7,506,368 B1 * | 3/2009 | Kersey et al. .................. | 726/12 |
| 2006/0248575 A1 * | 11/2006 | Levow et al. ................... | 726/1 |
| 2007/0038853 A1 * | 2/2007 | Day et al. ...................... | 713/153 |
| 2008/0082662 A1 * | 4/2008 | Dandliker et al. ............. | 709/225 |
| 2008/0126794 A1 * | 5/2008 | Wang et al. ................... | 713/151 |
| 2010/0299525 A1 * | 11/2010 | Shah et al. .................... | 713/171 |
| 2011/0154019 A1 * | 6/2011 | Wang ............................ | 713/153 |

OTHER PUBLICATIONS

Duane Norton, SANS Institute, An Ettercap Primer, Apr. 14 2004, pp. 1-27.*
Robert Wagner, SANS Institute, Address Resolution Protocol Spoofing and Man-in-the-Middle Attacks Practical Assignment GSEC Version 1.2f, Aug. 2001,pp. 1-7.*
Callegati, F. et al., Man-in-the-Middle Attack to the HTTPS Protocol, Security & Privacy, IEEE,Jan.-Feb. 2009, vol. 7 , Issue: 1, pp. 78-81.*
Ornaghi, A and Valleri M., Man in the middle attacks Demos,Blackhat Conference 2003,pp. 1-35, http://www.blackhat.com/presentations/bh-usa-03/bh-us-03-ornaghi-valleri.pdf.*
"Net Nanny Parental Controls User Guide," ContentWatch, Inc., 2007, 83 pages.
Sotirov, A. et al., "MD5 Considered Harmful Today—Creating a Rogue CA Certificate," Dec. 30, 2008, pp. 1-25, [Online] [Retrieved on Apr. 22, 2011] Retrieved from the Internet<URL:http://www.win.tue.nl/hashclash/rogue-ca/>.
Tuecke, S. et al., "Internet X.509 Public Key Infrastructure Impersonation Certificate Profile," Feb. 2001, 27 pages, [Online] [Retrieved on Apr. 22, 2011] Retrieved from the Internet<URL:http://tools.ietf.org/html/draft-ietf-pkix-impersonation-00>.
"Web Monitoring Software—Norton Online Family," Symantec, 1995-2011, 2 pages, [Online] [Retrieved on Apr. 22, 2011] Retrieved from the Internet<URL:https://onlinefamily.norton.com/familysafety/features.fs>.

* cited by examiner

*Primary Examiner* — Farid Homayounmehr
*Assistant Examiner* — Olanrewaju Bucknor
(74) *Attorney, Agent, or Firm* — Fenwick & West LLP

(57) ABSTRACT

Embodiments of the present disclosure include methods (and corresponding systems and computer program products) for monitoring secured communication channels based on certificate authority impersonation. One aspect is a method comprising: intercepting a certificate transmitted by the remote server to the software application, the certificate comprising a public key; generating a first public key and a first private key pair for the intercepted certificate; replacing the public key in the intercepted certificate with the first public key; transmitting a modified intercepted certificate including the first public key to the software application in place of the intercepted certificate; and monitoring the security communication channel between the software application and the remote server, wherein the security communication channel is established based at least in part on the modified intercepted certificate.

18 Claims, 5 Drawing Sheets

MONITORING CONTENT TRANSMITTED THROUGH SECURED COMMUNICATION CHANNELS

BACKGROUND

1. Field of Disclosure

The disclosure generally relates to the field of computer security, in particular to monitoring secured network communications.

2. Description of the Related Art

In order to detect Internet fraud, it is often necessary to monitor content transmitted through communication channels. For example, parental control applications monitor online chat message exchanges to ensure that minors do not share sensitive private information such as phone numbers and home addresses with strangers online. To prevent data interception and tampering, computers establish secured communication channels using secure communication protocols such as the Secure Socket Layer (SSL), and exchange data through the secured communication channels. It is difficult to monitor content transmitted through a secured communication channel because such content is encrypted using an unpublished key.

Some software vendors attempt to monitor secured communication channels of a web browser by trying to access the web browser's memory through browser plug-ins and supported interfaces. However, not all network communication applications support plug-ins, and the interfaces are application-specific and modified often. Thus, this approach is temporary and ad hoc (e.g. targeting a specific web browser of a particular version) and cannot monitor secured communication channels established by other applications.

Accordingly, there is a need for new techniques that can monitor secured communication channels.

SUMMARY

Embodiments of the present disclosure include methods (and corresponding systems and computer program products) for monitoring secured communication channels based on certificate authority impersonation.

One aspect of the present disclosure is a computer implemented method for monitoring a secured communication channel between a software application and a remote server, comprising: intercepting a certificate transmitted by the remote server to the software application, the certificate comprising a public key; generating a first public key and a first private key pair for the intercepted certificate; replacing the public key in the intercepted certificate with the first public key; transmitting a modified intercepted certificate including the first public key to the software application in place of the intercepted certificate; and monitoring the security communication channel between the software application and the remote server, wherein the security communication channel is established based at least in part on the modified intercepted certificate.

Another aspect of the present disclosure is a computer system for monitoring a secured communication channel between a software application and a remote server, comprising: a non-transitory computer-readable storage medium storing executable computer program code for: intercepting a certificate transmitted by the remote server to the software application, the certificate comprising a public key; generating a first public key and a first private key pair for the intercepted certificate; replacing the public key in the intercepted certificate with the first public key; transmitting a modified intercepted certificate including the first public key to the software application in place of the intercepted certificate; and monitoring the security communication channel between the software application and the remote server, wherein the security communication channel is established based at least in part on the modified intercepted certificate.

Still another aspect of the present disclosure is a non-transitory computer-readable storage medium encoded with executable computer program code for monitoring a secured communication channel between a software application and a remote server, the computer program code comprising program code for: intercepting a certificate transmitted by the remote server to the software application, the certificate comprising a public key; generating a first public key and a first private key pair for the intercepted certificate; replacing the public key in the intercepted certificate with the first public key; transmitting a modified intercepted certificate including the first public key to the software application in place of the intercepted certificate; and monitoring the security communication channel between the software application and the remote server, wherein the security communication channel is established based at least in part on the modified intercepted certificate.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

System Environment

Figure 1:
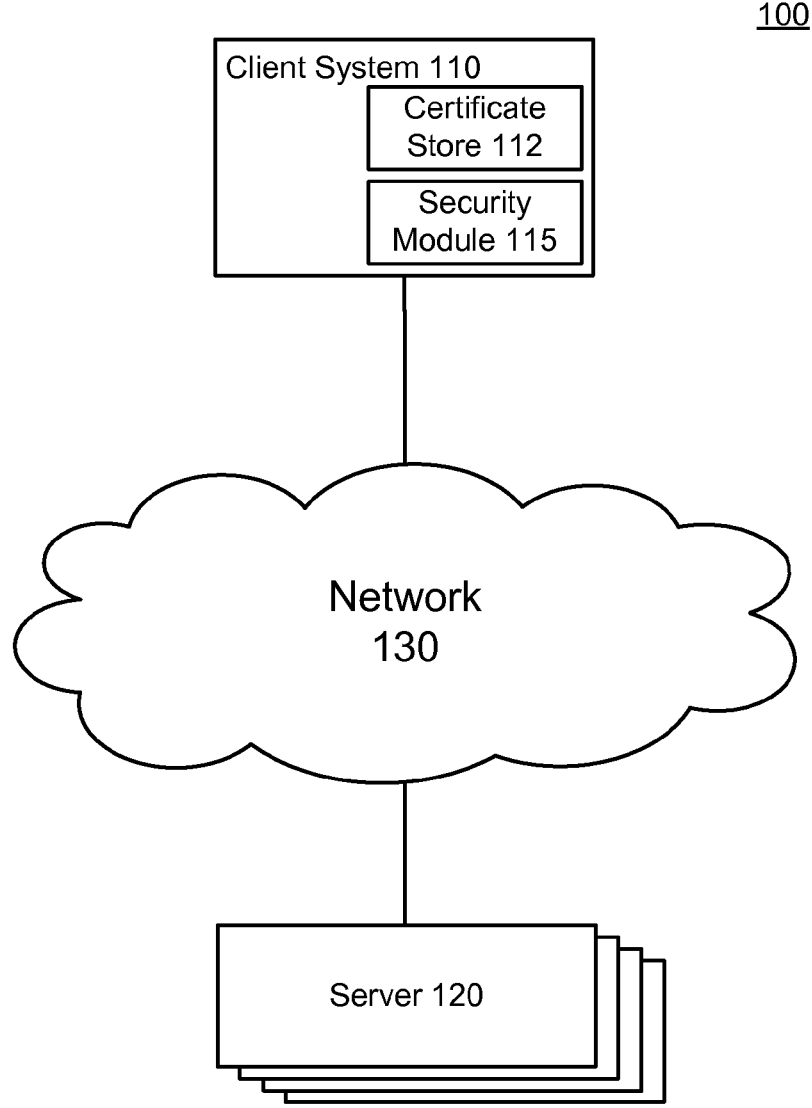
FIG. 1 is a high-level block diagram of a computing environment according to one embodiment of the present disclosure.

FIG. 1 is a high-level block diagram that illustrates a computing environment 100 for monitoring secured communication channels based on certificate authority impersonation, according to one embodiment of the present disclosure. As shown, the computing environment 100 includes a client system 110 and a plurality of remote servers 120 connected through a network 130. There can be other entities in the computing environment 100 as well.

The client system 110 is an electronic device that can communicate with a remote server 120 through the network 130. In one embodiment, the client system 110 is a conventional computer system executing, for example, a Microsoft Windows-compatible operating system (OS), Apple OS X, and/or a Linux distribution. In another embodiment, the client system 110 is another device having network functionality, such as a personal digital assistant (PDA), mobile telephone, video game system, etc. Software applications such as web browsers and instant messaging applications hosted on the client system 110 may establish secured communication channels with the remote servers 120 to engage in secured network communications. As shown, the client system 110 includes a local certificate storage 112 and a security module 115.

The local certificate storage 112 stores digital identity certificates of certificate authorities (also called the "CA certificates") used by software applications hosted on the client system 110 to validate digital identity certificates (also called the "certificates") received from the remote servers 120. A certificate is a piece of information issued by a certificate authority (CA) that certifies the ownership of an included public key by the party named in the certificate. The certificate is signed using an unpublished private key of the issuing CA, and can be validated using the public key of the issuing CA in the corresponding CA certificate stored in the local certificate storage 112. A CA certificate is issued either by another CA or by itself (in the case of a trusted root CA), and is signed using the private key of the issuing CA, forming a chain of trust that ends at the trusted root CA. In order to establish a secured communication channel with the client system 110, a remote server 120 provides its certificate to the client system 110 for the client system 110 to validate the identity of the remote server 120, and the client system 110 can use the public key in the certificate to encrypt data (e.g., a symmetric session key) to be transmitted to the remote server 120, who can then use a corresponding unpublished private key to decrypt the encrypted data and thereby achieving secured communication. A public key and the corresponding private key are collectively referred to as a public-private key pair. The local certificate storage 112 may be a relational database, an XML (Extensible Markup Language) file, or any other type of database. Only one local certificate storage 112 is illustrated for clarity, even though there may be multiple local certificate storage 112 in the client system 110 each used by one or more software applications. Software applications may search for, retrieve, add, remove, and/or alter certificates stored in the local certificate storage 112 by supported means (e.g., application programming interface (API) calls, query language commands, editing operations).

The security module 115 monitors secured communication channels established by applications hosted on the client system 110, and applies one or more security rules of a local security policy to ensure that contents transmitted through the secured communication channels are proper. For example, the security module 115 filters outgoing sensitive personal information and blocks incoming uniform resource locators (URLs) of known malicious websites. In order to monitor secured communication channels, the security module 115 generates a new public-private key pair for each CA certificate in the local certificate storage 112, and overwrites the public key in the CA certificate with the newly generated public key. The security module 115 intercepts certificates sent by the remote servers 120 to the local applications in order to establish the secured communication channels (also called the "handshaking phase"), and replaces the public keys in the certificates with public keys generated by the security module 115, and forwards the modified certificates to the local applications. In order to make a modified certificate appear authentic to a local application and thus causing the local application to believe that there is no interception, the security module 115 signs the modified certificate using the private key generated for the CA who issued the original certificate. The security module 115 intercepts subsequent messages, decrypts these messages using a symmetric session key intercepted during the handshaking phase, examines the decrypted contents for security purposes, and forwards the intercepted messages to their intended destinations.

A remote server 120 is a hardware device and/or software program configured to communicate with the client system 110 through the network 130. The remote server 120 is able to establish a secured communication channel with the client system 110 using a secure communication protocol such as the Secure Socket Layer (SSL). In order to establish a secured communication channel, the remote server 120 has an unpublished private key and a certificate issued by a CA, which includes a corresponding public key, a name of the remote server 120, and a digital signature of the CA. Examples of the remote server 120 include an instant messaging server, a web-based mail server, and an online banking server, to name a few.

The network 130 enables communications between the client system 110 and the remote servers 120. In one embodiment, the network 130 uses standard communications technologies and/or protocols. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 130 can also include links to other networks such as the Internet.

Computer Architecture

Figure 2:
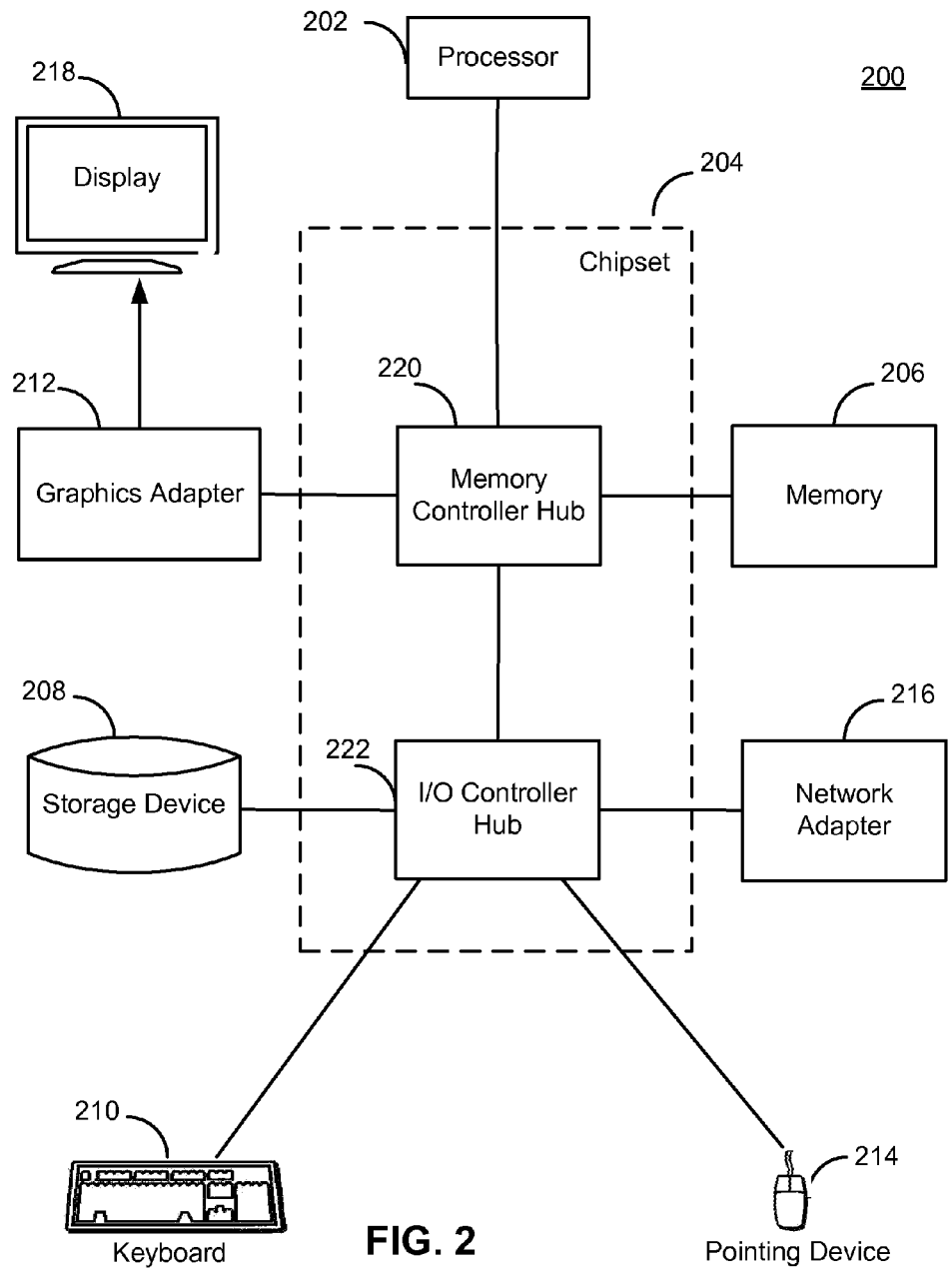
FIG. 2 is a high-level block diagram illustrating an example of a computer for use in the computing environment shown in FIG. 1 according to one embodiment of the present disclosure.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display 218. The network adapter 216 couples the computer system 200 to one or more computer networks.

The computer 200 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, a remote server 120 might comprise multiple blade servers working together to provide the functionality described herein. As another example, the client system 110 might comprise a mobile telephone with limited processing power. The computers 200 can lack some of the components described above, such as keyboards 210, graphics adapters 212, and displays 218.

Example Architectural Overview of the Security Module

Figure 3:
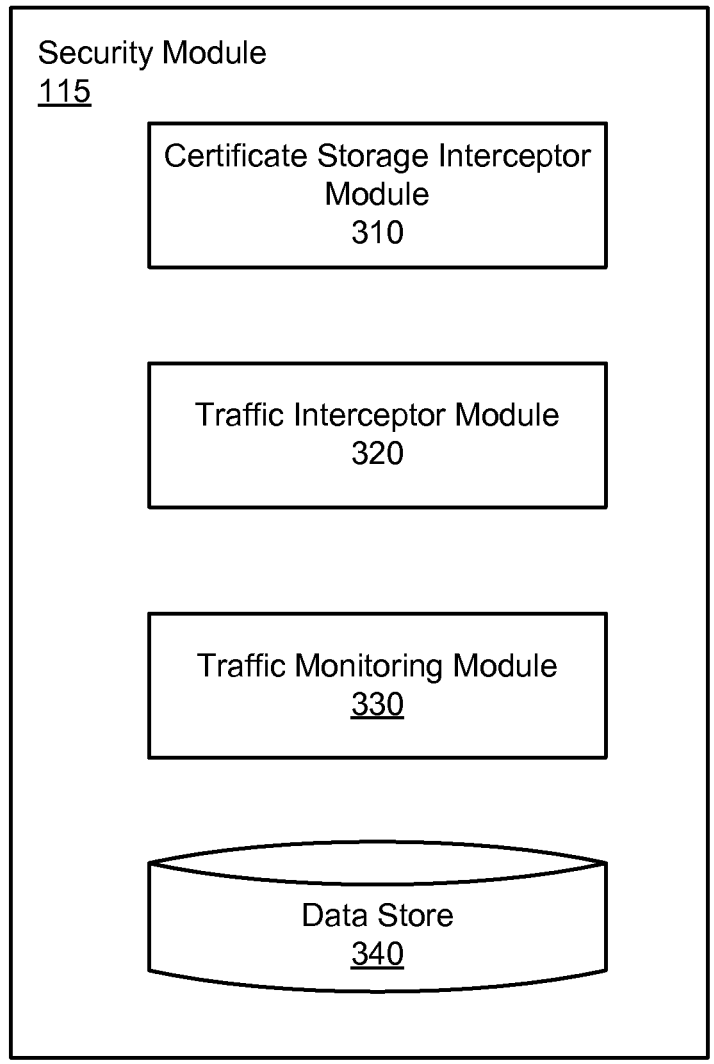
FIG. 3 is a high-level block diagram illustrating modules within a security module according to one embodiment of the present disclosure.

FIG. 3 is a high-level block diagram illustrating a detailed view of modules within the security module 115, according to one embodiment. Some embodiments of the security module 115 have different and/or other modules than the ones described herein. Similarly, the functions can be distributed among the modules in accordance with other embodiments in a different manner than is described here. As illustrated, the security module 115 includes a certificate storage interceptor module 310, a traffic interceptor module 320, a traffic monitoring module 330, and a data store 340.

The certificate storage interceptor module 310 backs up the existing CA certificates in the local certificate storage 112 (e.g., by storing them in the data store 340), generates a new pair of public-private key for each CA certificate, and overwrites the original public key in the CA certificate using the new public key. The certificate storage interceptor module 310 leaves the other information in the CA certificate unchanged (e.g., serial number, validity time period, subject name). The certificate storage interceptor module 310 overwrites public keys in the local certificate storage 112 using a mechanism supported by the local certificate storage 112, such as an API, or according to a published structure of the local certificate storage 112. In addition, in order to make a modified CA certificate (including the newly generated public key) appear authentic, the certificate storage interceptor module 310 re-signs the modified CA certificate using the private key newly generated for the CA that issued the original CA certificate, and repeats this re-signing process for the other CAs in the chain of trust until re-signing the CA certificate of the trusted root CA using the private key newly generated for the trusted root CA. There may be more than one local certificate storage 112 in the client system 110 and the certificate storage interceptor module 310 processes all of them in one embodiment. In one embodiment, the certificate storage interceptor module 310 only overwrites the public keys of certain CA certificates and leaves the other CA certificates intact, while in other embodiments the certificate storage interceptor module 310 overwrites the public keys of all CA certificates in the local certificate storage 112.

In an alternative embodiment, instead of overwriting the original CA public keys stored in the local certificate storage 112 using newly generated public keys, the certificate storage interceptor module 310 stores the modified CA certificates including the newly generated public keys in another storage location, intercepts requests from software applications for CA certificates in the local certificate storage 112, and redirects the intercepted requests to the other storage location where the modified CA certificates are stored.

To further improve security, the certificate storage interceptor module 310 may periodically generate/rotate new public-private key pairs. The certificate storage interceptor module 310 (or the traffic interceptor module 320) may also intercept/monitor related network communications to detect instructions to add/update/remove CA certificates (e.g., Automatic Root Certificate Update requests), such that the certificate storage interceptor module 310 may overwrite their public keys and/or update the CA certificate backup, and thereby maintain data integrity.

The traffic interceptor module 320 intercepts messages (or packets) exchanged between a local application and a remote server 120 attempting to establish a secured communication channel by monitoring traffic on a port used by the underlying secure communication protocol, such as port number 443 (used by SSL), and impersonating the local application and the remote server 120 to each other. The traffic interceptor module 320 intercepts a certificate from the remote server 120, replaces the public key in the certificate with a newly generated public key while leaving other information in the certificate unchanged, signs the modified certificate using the private key generated for the CA who issued the original certificate, and forwards the modified certificate to the local application. The security module 115 intercepts an encrypted symmetric session key selected by the local application for use in the communications session, decrypts it using the private key generated for the CA, re-encrypts using the public key of the remote server 120 in the received certificate, and transmits the re-encrypted symmetric session key to the remote server 120. The security module 115 monitors subsequent message exchanges between the local application and the remote server 120 by decrypting these messages using the symmetric session key.

The traffic monitoring module 330 examines the messages (or packets) transmitted between the local application and the remote server 120 through the secured communication channel according to a local security policy. The traffic monitoring module 330 may maintain a malicious list of banned words/phrases/sentences and/or URLs of known malicious websites and/or a sensitive list of sensitive information (e.g., personal information such as telephone numbers and addresses). The traffic monitoring module 330 may detect improper content in the secured communication channel by searching for text in the malicious/sensitive list in the messages according to one or more security rules in the local security policy. The traffic monitoring module 330 may also detect malicious/sensitive information in the messages using technologies such as pattern matching and/or natural language processing according to other security rules in the local security policy. Once the traffic monitoring module 330 detects an improper message (e.g., a message including malicious/sensitive information) by applying a security rule, the traffic monitoring module 330 may perform a security action specified in the security rule, such as closing the secured connection channel, and throwing away the message without forwarding it to the intended destination. Depending on the underlying secure communication protocol, the traffic monitoring module 330 may create a message with no content inside, and transmit the created message to the intended destination instead of the message containing the malicious/sensitive information (e.g., to keep a packet counters up to sync) instead of throwing away the message.

The data store 340 stores data used by the security module 115. Examples of such data include the backed up CA certificates, the received server certificates, the generated public-private key pairs, and the lists of sensitive/malicious information, to name a few. The data store 340 may be a relational database or any other type of database.

Overview of Methodology for the Security Module

Figure 4:
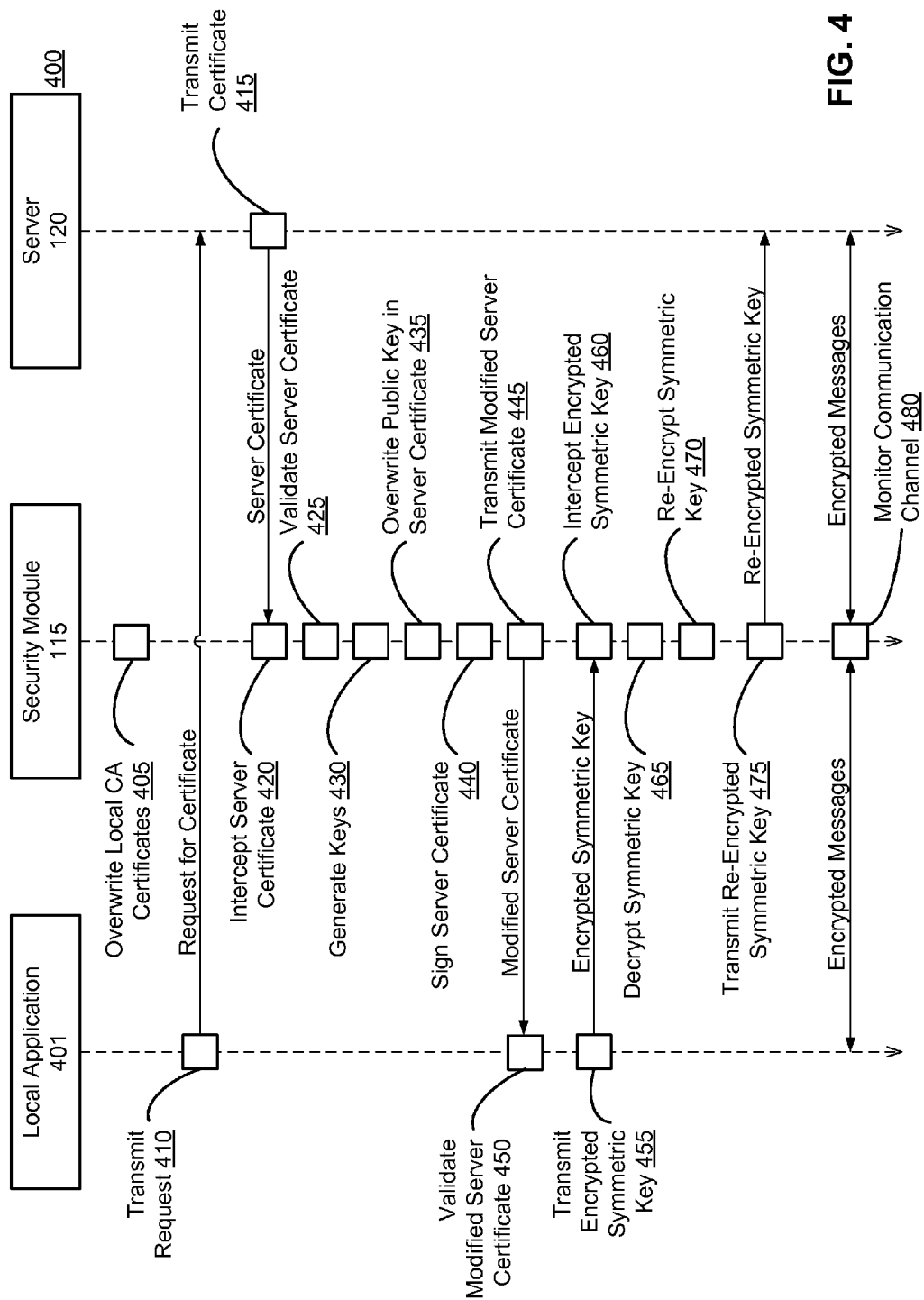
FIGS. 4 and 5 are diagrams collectively illustrating a process for monitoring secured communication channels based on certificate authority impersonation according to one embodiment of the present disclosure.

FIG. 4 is a time-sequence diagram illustrating a process 400 for the security module 115 to monitor a secured communication channel between a local application 401 hosted on the client system 110 and a remote server 120, according to one embodiment. Other embodiments can perform the steps of the process 400 in different orders. Moreover, other embodiments can include different and/or additional steps than the ones described herein.

Initially the security module 115 backs up the local certificate storage 112 where CA certificates are stored. For purpose of description only, the CA certificates are denoted as Certificates(CAs, Original), and the public key in a Certificate (CA, Original) is denoted as PublicKey(CA, Original). The security module 115 generates a pair of public-private keys for each of the CA certificates in the local certificate storage denoted as PublicKey(CA, Modified) and PrivateKey(CA, Modified) respectively, and overwrites 405 the public key originally in the certificate with the generated public key. The resulting certificate is denoted as Certificate(CA, Modified). Alternatively, the security module 115 stores Certificate(CA, Modified) in another storage location, intercepts requests for the CA certificate in the local certificate storage 112, and redirects the intercepted requests to the other storage location where Certificate(CA, Modified) is stored.

A local application 401 hosted on the client system 110 transmits 410 a request to the remote server 120 for a digital identity certificate to establish a secured communication channel. The remote server 120 receives the request and in response transmits 415 its certificate signed by a CA. The certificate sent from the remote server 120 is denoted as Certificate(Server, CA, Original) and includes a public key of the server denoted as PublicKey(Server, Original). The security module 115 intercepts 420 the certificate, Certificate (Server, CA, Original), and validates 425 the certificate using the original public key of the CA who issued the certificate, PublicKey(CA, Original). The security module 115 generates 430 a pair of public-private keys for the server, denoted as PublicKey(Server, Modified) and PrivateKey(Server, Modified) respectively, and overwrites 435 the original public key of the server, PublicKey(Server, Original), in the certificate with the generated public key, PublicKey(Server, Modified). The security module 115 signs 440 the modified certificate using the modified private key for the CA, PrivateKey(CA, Modified), and transmits 445 the signed modified certificate, Certificate(Server, CA, Modified), to the local application 401.

The local application 401 validates 450 the received certificate, Certificate(Server, CA, Modified), using the modified public key, PublicKey(CA, Modified), in the modified CA certificate, Certificate(CA, Modified), retrieved from the local certificate storage 112. Because the modified server certificate is signed using the private key matching the public key in the modified CA certificate stored in the local certificate storage 112, the local application validates 450 the modified server certificate successfully and thus assumes that there is no interception, and transmits 455 to the remote server 120 a randomly selected symmetric session key (along with a symmetric encryption algorithm) encrypted using the modified public key of the remote server 120, PublicKey(Server, Modified), in the modified server certificate, Certificate (Server, CA, Modified).

The security module 115 intercepts 460 the encrypted symmetric session key, decrypts 465 the encrypted symmetric session key using the generated private key for the server, PrivateKey(Server, Modified), to learn the symmetric session key (and the symmetric encryption algorithm), re-encrypts 470 the decrypted symmetric session key using the original server public key, PublicKey(Server, Original), and transmits 475 the re-encrypted symmetric session key to the remote server 120.

After the remote server 120 receives the re-encrypted symmetric session key, communications between the local application 401 and the remote server 120 are encrypted using the symmetric session key. The security module 115 monitors 480 the encrypted messages exchanged between the local application 401 and the remote server 120. The monitoring step 480 is illustrated in FIG. 5 and described in detail below.

Figure 5:
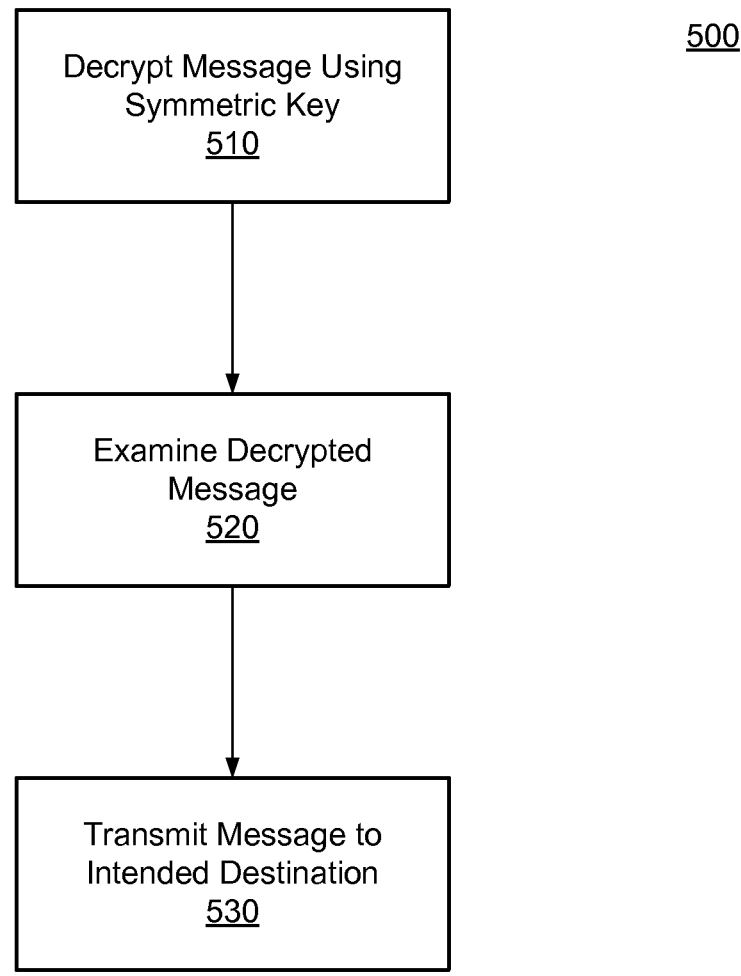

Referring now to FIG. 5, shown is a flow diagram illustrating a process 500 for the security module 115 to monitor an established secured communication channel, according to one embodiment. As shown, the security module 115 decrypts 510 messages received from both directions using the intercepted symmetric session key, examines 520 the content of the messages for security purposes, and transmits 530 the intercepted messages to their intended destinations.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for monitoring secured communication channels based on certificate authority impersonation. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A computer implemented method for monitoring a secured communication channel between a software application included in a computer system and a remote server, the method comprising:
    identifying, by a computer system, a certificate authority (CA) certificate stored in a local storage accessible by the computer system, the CA certificate including an original public key;
    generating, by the computer system, a key pair that includes first public key and a first private key;
    modifying, by the computer system, the CA certificate by replacing the original public key with the first public key;
    intercepting, by the computer system, an intercepted certificate transmitted by a the remote server to the a software application, the intercepted certificate comprising an intercepted public key;
    generating, by the computer system, a second public key for the intercepted certificate;
    modifying, by the computer system, the intercepted certificate by replacing the intercepted public key in the intercepted certificate with the second public key;
    signing, by the computer system, the modified intercepted certificate using the first private key of the key pair;
    transmitting, by the computer system, the modified intercepted certificate including the second public key to the software application;
    intercepting, by the computer system, a symmetric session key transmitted by the software application to the remote server;
    decrypting, by the computer system, the symmetric session key using a second private key associated with the second public key;
    re-encrypting, by the computer system, the symmetric session key using the intercepted public key included in the intercepted certificate;
    transmitting, by the computer system, the re-encrypted symmetric session key to the remote server; and
    monitoring, by the computer system, the security communication channel between the software application and the remote server using the symmetric session key.

2. The method of claim 1, further comprising:
validating the intercepted certificate using the original public key.

3. The method of claim 1, further comprising:
generating a third public key and a third private key pair for a second CA certificate; and
replacing a digital signature in the second CA certificate with a modified digital signature generated based at least in part on the third private key and the first public key.

4. The method of claim 1, further comprising:
decrypting messages received from the software application and the remote server using the symmetric session key; and
examining the decrypted messages according to a security policy.

5. The method of claim 1, further comprising:
responsive to a message in the security communication channel not in compliance with a security policy, performing a security action comprising one of: (1) dropping the message without transmitting the message to an intended destination and (2) terminating the security communication channel.

6. The method of claim 5, wherein dropping the message comprises transmitting a message in compliance with the security policy to the intended destination in place of the message not in compliance with the security policy.

7. A computer system for monitoring a secured communication channel between a software application and a remote server, the system comprising:
    a processor for executing computer program code; and
    a non-transitory computer-readable storage medium storing executable computer program code for:
        identifying a certificate authority (CA) certificate stored in a local storage accessible by the computer system, the CA certificate including an original public key;
        generating a key pair that includes first public key and a first private key;
        modifying the CA certificate by replacing the original public key with the first public key;
        intercepting an intercepted certificate transmitted by a the remote server to the a software application, the intercepted certificate comprising an intercepted public key;
        generating a second public key for the intercepted certificate;
        modifying the intercepted certificate by replacing the intercepted public key in the intercepted certificate with the second public key;
        signing the modified intercepted certificate using the first private key of the key pair;
        transmitting the modified intercepted certificate including the second public key to the software application;
        intercepting a symmetric session key transmitted by the software application to the remote server;
        decrypting the symmetric session key using a second private key associated with the second public key;
        re-encrypting the symmetric session key using the intercepted public key included in the intercepted certificate;
        transmitting the re-encrypted symmetric session key to the remote server; and
        monitoring the security communication channel between the software application and the remote server using the symmetric session key.

8. The computer system of claim 7, wherein the non-transitory computer-readable storage medium further comprises executable computer program code for:
   validating the intercepted certificate using the original public key.

9. The computer system of claim 7, wherein the non-transitory computer-readable storage medium further comprises executable computer program code for:
   generating a third public key and a third private key pair for a second CA certificate; and
   replacing a digital signature in the second CA certificate with a modified digital signature generated based at least in part on the third private key and the first public key.

10. The computer system of claim 7, wherein the non-transitory computer-readable storage medium further comprises executable computer program code for:
   decrypting messages received from the software application and the remote server using the symmetric session key; and
   examining the decrypted messages according to a security policy.

11. The computer system of claim 7, wherein the non-transitory computer-readable storage medium further comprises executable computer program code for:
   responsive to a message in the security communication channel not in compliance with a security policy, performing a security action comprising one of: (1) dropping the message without transmitting the message to an intended destination and (2) terminating the security communication channel.

12. The computer system of claim 11, wherein the non-transitory computer-readable storage medium further comprises executable program code for:
   dropping the message by transmitting a message in compliance with the security policy to the intended destination in place of the message not in compliance with the security policy.

13. A non-transitory computer-readable storage medium encoded with executable computer program code for monitoring a secured communication channel between a software application and a remote server, the computer program code comprising program code for:
   identifying a certificate authority (CA) certificate stored in a local storage accessible by the computer system, the CA certificate including an original public key;
   generating a key pair that includes first public key and a first private key;
   modifying the CA certificate by replacing the original public key with the first public key;
   intercepting an intercepted certificate transmitted by a remote server to a software application, the intercepted certificate comprising an intercepted public key;
   generating a second public key for the intercepted certificate;
   modifying the intercepted certificate by replacing the intercepted public key in the intercepted certificate with the second public key;
   signing the modified intercepted certificate using the first private key of the key pair;
   transmitting the modified intercepted certificate including the second public key to the software application;
   intercepting a symmetric session key transmitted by the software application to the remote server;
   decrypting the symmetric session key using a second private key associated with the second public key;
   re-encrypting the symmetric session key using the intercepted public key included in the intercepted certificate;
   transmitting the re-encrypted symmetric session key to the remote server; and
   monitoring the security communication channel between the software application and the remote server using the symmetric session key.

14. The non-transitory computer-readable storage medium of claim 13, wherein the computer program code further comprises program code for:
   validating the intercepted certificate using the original public key.

15. The non-transitory computer-readable storage medium of claim 13, wherein the computer program code further comprises program code for:
   generating a third public key and a third private key pair for a second CA certificate; and
   replacing a digital signature in the second CA certificate with a modified digital signature generated based at least in part on the third private key and the first public key.

16. The non-transitory computer-readable storage medium of claim 13, wherein the computer program code further comprises program code for:
   decrypting messages received from the software application and the remote server using the symmetric session key; and
   examining the decrypted messages according to a security policy.

17. The non-transitory computer-readable storage medium of claim 13, wherein the computer program code further comprises program code for:
   responsive to a message in the security communication channel not in compliance with a security policy, performing a security action comprising one of: (1) dropping the message without transmitting the message to an intended destination and (2) terminating the security communication channel.

18. The non-transitory computer-readable storage medium of claim 17, wherein the computer program code further comprises program code for:
   dropping the message by transmitting a message in compliance with the security policy to the intended destination in place of the message not in compliance with the security policy.

\* \* \* \* \*

UNITED STATES PATENT AND TRADEMARK OFFICE
CERTIFICATE OF CORRECTION

| | | |
|---|---|---|
| PATENT NO. | : 8,843,750 B1 | Page 1 of 1 |
| APPLICATION NO. | : 13/016394 | |
| DATED | : September 23, 2014 | |
| INVENTOR(S) | : Ilya Sokolov | |

It is certified that error appears in the above-identified patent and that said Letters Patent is hereby corrected as shown below:

In the Claims

Column 10, line 45, after "transmitted by a" delete "the".

Column 10, line 46, after "remote server to" delete "the".

Signed and Sealed this
Eighth Day of September, 2015

Michelle K. Lee
*Director of the United States Patent and Trademark Office*